3,371,545
VALVE OPERATING EQUIPMENT
Daniel R. McNeal, Jr., Lansdale, and Lorenzo Boscaino, Norristown, Pa., assignors to Andale Company, Lansdale, Pa., a corporation of Pennsylvania
Filed Aug. 10, 1966, Ser. No. 571,464
7 Claims. (Cl. 74—89.15)

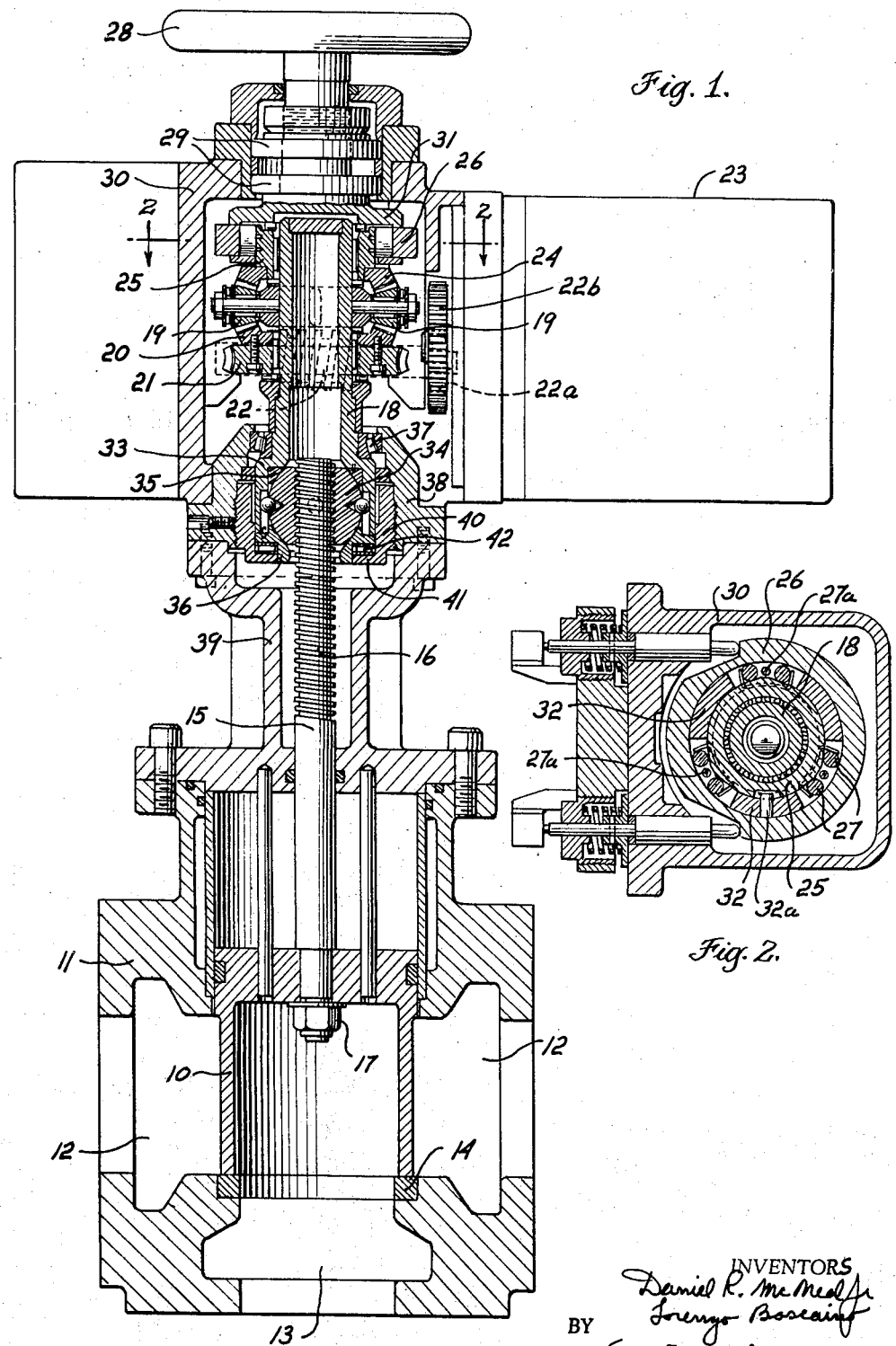

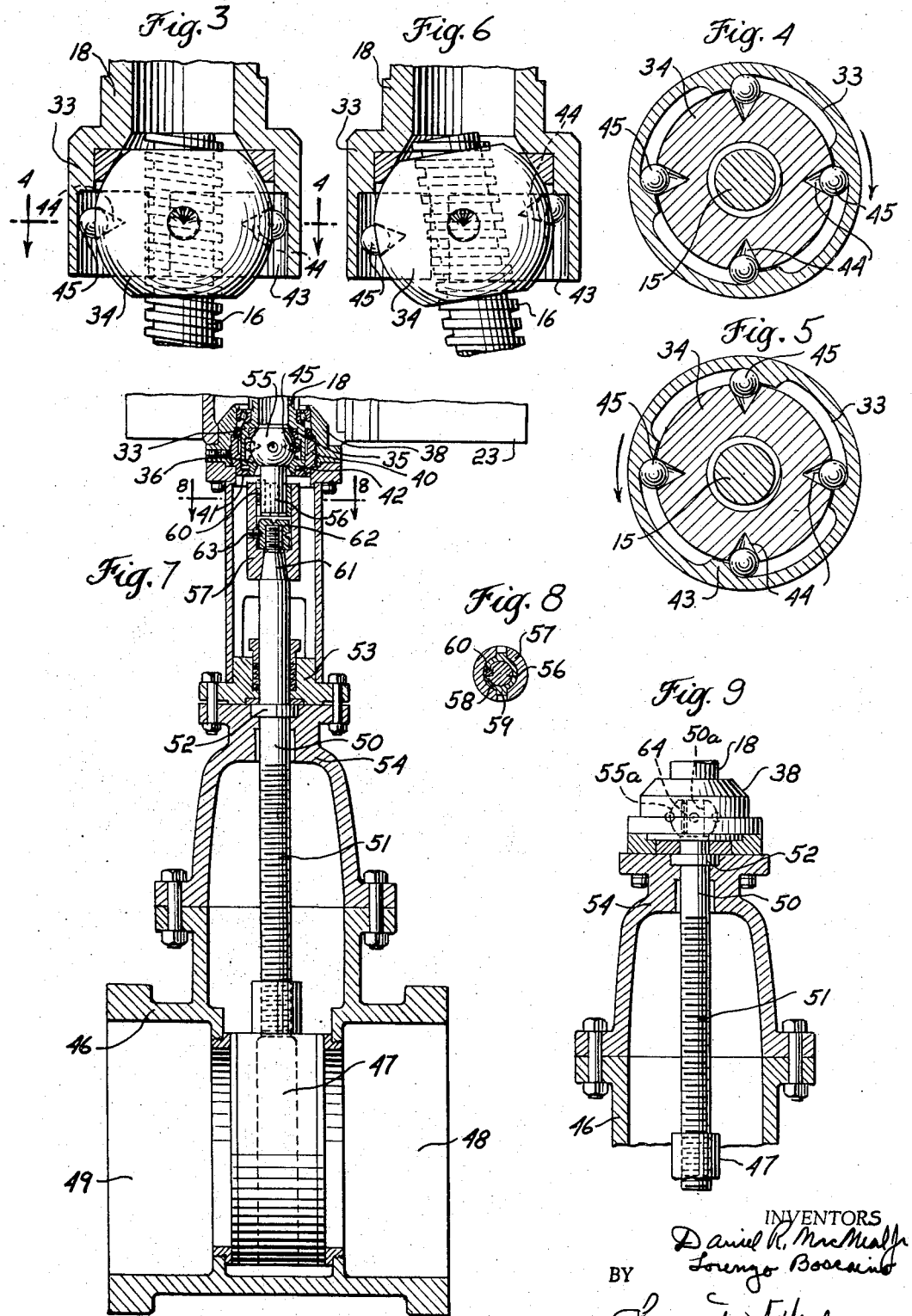

This invention relates to valve operating equipment particularly valves of the type having an operating stem, and also having either or both of a manual or powered mechanism for delivering valve operating motions to the valve stem. The invention is concerned with an operating connection adapted to be introduced between the valve stem and the operating mechanism.

In accordance with the invention, a novel valve operating connection for use in the manner referred to is provided, in order to secure a number of advantages, including the following:

First, the operating connection of the present invention is "self-aligning," i.e., it automatically compensates for angular misalignment of the valve stem and the valve operating mechanism.

The operating connection of the present invention further provides for delivery of a "hammer blow" from the operating mechanism to the valve stem, thereby facilitating the loosening of a valve which may have become stuck because of corrosion or accumulation of foreign matter.

The operating connection of the present invention incorporates cooperating sphere and socket members, one of which, preferably the sphere member, is associated with the valve stem, and the other of which is associated with the operating mechanism, the sphere and socket members being adapted to be drivingly interconnected by means of three or more balls. This assembly permits the transmission of thrust through the operating connection while at the same time providing for slight radial shift in position of the sphere member so as to accommodate or compensate for minor parallel misalignment of the valve stem and the valve operating mechanism.

How the foregoing objects and advantages are obtained will appear more fully in the following description referring to the accompanying drawings in which:

FIGURE 1 is a longitudinal sectional view through a valve, a valve operating mechanism and the operating connection of the present invention interposed between the operating mechanism and the stem of the valve shown, the type of valve here illustrated being one in which the valve stem is axially shifted to effect opening and closing of the valve;

FIGURE 2 is a transverse sectional view taken as indicated by line 2—2 on FIGURE 1;

FIGURE 3 is a fragmentary longitudinal sectional view through the operating connection of the present invention on an enlarged scale as compared to FIGURE 1, and with certain parts shown in elevation;

FIGURE 4 is a transverse sectional view of parts taken as indicated by the section line 4—4 on FIGURE 3;

FIGURE 5 is a view similar to FIGURE 4 but illustrating certain of the parts in different positions;

FIGURE 6 is a view similar to FIGURE 3 but showing the sphere and socket members in relatively angled positions in order to illustrate the capability of the connection to compensate for angular misalignment of a valve stem and valve operating mechanism;

FIGURE 7 is a vertical sectional view of a modified arrangement in which the valve operating connection of the invention is adapted for use with a valve having an operating stem which is turned in order to effect opening and closing movemet of the valve, in contrast to the arrangement of FIGURE 1 wherein the valve is opened and closed by axial movement of the stem;

FIGURE 8 is a transverse sectional view taken as indicated by the section line 8—8 in FIGURE 7; and FIGURE 9 is a fragmentary view of certain parts shown in FIGURE 7 but illustrating another modification.

Turning first to the arrangement illustrated in FIGURES 1–6 inclusive, attention is first directed to the general arrangement of the valve as shown in FIGURE 1. Here the valve comprises an axially shiftable cylindrical valve member 10 positioned within a valve body 11 having flow passages or ports such as indicated at 12 and 13. When the cylindrical member 10 is brought down against the seat 14 the valve is closed, and when the cylindrical member 10 is raised the valve is opened. These reciprocating motions of the valve 10 are effected by a stem 15 an upper portion of which is provided with a thread 16, the valve stem being nonrotatably associated with the valve itself, for instance by means of the clamping nut 17.

The valve operating mechanism is shown toward the top of FIGURE 1 and appears also in FIGURE 2. The operating mechanism here shown is not per se a part of the present invention but quite closely conforms with that illustrated and described in the Bacchi et al. Patent 3,218,886 issued Nov. 23, 1965.

In view of the foregoing, the details of the operating mechanism will not be described herein. However, a few of the principal parts will be pointed out and it is first to be noted that the operating mechanism as shown includes both manual and powered mechanisms for rotating the driven shaft 18 of the operating mechanism. The shaft 18 carries bevel planet pinions 19 which mesh with the side gear 20 positioned below the pinions, this side gear being secured to the worm wheel 21 adapted to be turned by the worm 22 which, in turn, is adapted to be driven through gearing 22a and 22b by a motor enclosed in the casing shown at 23.

Above the pinions 19 is another side gear 24 connected with the cylindrical part 25 which is rotatively mounted on the driven shaft 18 (see also FIGURE 2). A torque ring 26 surrounds the part 25, and jamming or locking rollers 27 are positioned in cavities between the parts 25 and 26. With this arrangement, when the motor is operated to rotate the driven shaft 18 through the planet pinions 19, the torque ring 26 serves as a reaction point, in the manner fully explained in the Bacchi et al., patent above referred to.

The operating mechanism as shown in FIGURE 1 further includes hand wheel 28 which is journaled by bearings 29 in the housing 30 and which is connected with the hand driven part 31 which in turn carries the arcuate parts 32 which project into the space between the torque rings 26 and the cylindrical part 25 (see particularly FIGURE 2). With this hand wheel arrangement, as is fully explained in the above identified Bacchi et al. patent, when the hand wheel is turned the locking rollers 27 are released by pins 27a carried by the hand wheel parts 32. The motion initiated by the hand wheel is delivered to the side gear 24 by engagement of key 32a with one side or the other of the cooperating oversized keyway in the part 25, and thereby rotates the driven shaft 18 through the planet pinions 19. At this time the worm 22 and worm wheel 21 constitute an irreversible system providing a reaction point for the hand operation.

The operating connection of the present invention interconnects the valve operating mechanism as described just above with the valve stem 15. This operating connection includes a socket member 33 formed at the lower end of the driven shaft 18, the socket member being generally cylindrical in shape and arranged to receive the sphere member 34. Abutment rings 35 and 36 are positioned between the socket and sphere members and serve as reaction points for the axial thrust developed in the stem 15 as a result of rotation of the sphere member 34. The sphere member 34 may also angularly shift on its seating on the rings 35 and 36. Moreover the sphere member 34 may turn somewhat within the socket.

The lower end of the driven shaft 18 is journaled by means of a tapered roller bearing 37 in a housing part 38 rigidly fastened to the housing 30 and serving also as an interconnection between the housing 30 and the structure 39 which interconnects the operating mechanism with the valve body 11.

The socket and sphere members and the interposed abutment rings 35 and 36 are retained in assembled relation by means of the threaded cup 40 having a flange 41 at its lower end cooperating with a thrust bearing 42 against which the abutment ring 36 bears during the valve lifting operation.

The sphere member 34 is provided with internal threads complementary to the thread 16 of the valve stem 15, so that upon rotation of the sphere member 34 the valve stem is raised or lowered.

The rotative motion of the driven shaft 18 is of course communicated to the socket member 33, and this rotative motion is in turn transferred to the sphere member 34 by a drive system most clearly illustrated in FIGURES 3–6 inclusive. As there shown the generally cylindrical socket is provided with internal arcuate grooves separated by abutments 43. Moreover the sphere member 34 is provided with recesses 44 and driving balls 45 are positioned between the socket and sphere members, each ball being partially reecived within one of the grooves of the socket member and partially within one of the recesses of the sphere member.

As will be clear from comparison of FIGURES 4 and 5, the arrangement just described provides for limited relative rotation of the sphere and socket members, i.e., rotation generally corresponding to the arcuate length of the individual arcuate grooves at the inner surfaces of the socket member. It will be noted that four driving balls, grooves and recesses are provided in the arrangement illustrated, but it will be understood that a different number may be employed, but preferably not less than three.

When the socket member is turned in one direction by the driven shaft 18, the motion may be free until the driving balls 45 engage the abutments at the ends of the arcuate grooves within the socket member. Thereafter the sphere member 34 will rotate with the socket member and this rotation will communicate an axial thrust to the valve stem 15 through the thread on the valve stem. This transmission of thrust from the socket to the ball will occur notwithstanding angular misalignment of the operating mechanism including the driven shaft 18, with respect to the valve stem 15, as will be clear from examination of FIGURE 6. The lost motion introduced in the driving connection by virtue of the arcuate grooves within the socket serves an important function because it provides for the delivery of a jolt or hammer blow from the valve operating mechanism to the valve stem, thereby providing for loosening of a valve which may be stuck as a result of corrosion or accumulation of foreign material.

With slight tolerance or clearance between the outside surface of the sphere member 34 and the abutments 43 at the ends of the grooves inside the socket, the operating connection of the present invention may also serve to accommodate minor parallel misalignment of the valve stem and its operating mechanism.

The embodiment described above with reference to FIGURES 1–6 inclusive is illustrative of the application of the invention to a valve and valve operating mechanism of the kind in which the valve stem is axially shifted in one direction or the other for the purpose of opening or closing the valve.

The arrangement of the invention is also applicable to valves and valve operating mechanisms where the operation of the valve is effected by rotation of the valve stem, rather than the axial movement of the valve stem. Embodiments of the invention adapted to this latter type of valve are illustrated in FIGURES 7–9 and described below.

As seen in FIGURE 7 a valve body 46 encloses a valve 47 adapted to control the flow between passages 48–49. The valve 47 is adapted to be raised and opened or lowered and closed by means of the valve stem 50 having a threaded portion 51 cooperating with the valve so that upon rotation of the valve stem the valve 47 is opened or closed. The valve stem 50 is prevented from shifting longitudinally or axially by means of an abutment 52 which is positioned between the mounting parts 53 and 54, the latter of which is secured to the valve body 46. The part 53 serves also to support the valve operating mechanism, as well as the operating connection which is interposed between the operating mechanism and the valve stem in a position similar to that in the embodiment of FIGURE 1–6, although the arrangement is modified so as to provide for transmission of rotary or turning motion through the operating connection to the valve stem, instead of longitudinal motion as in FIGURES 1–6.

In connection with FIG. 7 it may here be assumed that the valve operating mechanism as shown in FIGURE 1 is superimposed at the top of the structure shown in FIGURE 7, including the casing structure 30, the motor enclosing housing 23, the driven shaft 18 and the socket 33, as well as various parts associated therewith, such as those indicated at 38, 35, 36, 40, 41 and 42.

In the embodiment of FIGURE 7, however, the sphere member 55 which is received within the socket 33, is not provided with an internal thread, as in FIGURES 1–6, but is provided with a stub or projection 56 which extends downwardly into the upper cylindrical portion of the connection part 57, the parts 56 and 57 being rotatively interconnected through a sleeve 58 which is keyed to the part 57 by projections 59 and which is connected to that part 56 by a key 60. This arrangement provides for transmission of rotative forces from the sphere member 55 and its projection 56 to the connecting part 57, without restraining relative axial adjustment movement between the parts 56 and 57.

The lower end of the part 57 is provided with a tapered aperture to receive the upper tapered end 61 of the valve stem and thereby provide for transmission of the turning force from the member 57 to the valve stem. Separation of the valve stem and the part 57 is prevented by the nut 62, axial displacement of which within the member 57 is prevented by the set screw 63 threaded in the wall of the member 57 and having its inner end projecting into a circumferential groove in the nut 62.

As in the embodiment first described, the rotative motion of the driven shaft 18 is transmitted from the socket member 33 to the sphere 55 by means of balls 45 which are positioned in part within recesses formed in the sphere member and in part within grooves formed inside of the socket member. Thus, in this arrangement, as in the embodiment first described, the socket and sphere members will serve to accommodate angular misalignment of the valve stem and valve operating mechanism and may also be used to develop a hammer blow for the purpose of loosening a valve stem or the valve when it is desired to move the valve. In this instance the hammer blow is delivered rotatively to the valve stem.

FIGURE 9 shows a variation of the arrangement of FIGURE 7 in which the adaptor, including the cylindrical connection part 57 is eliminated. In this arrangement the sphere member 55a is directly connected to a reduced upper end portion 50a of the valve stem 50 by means of a key 64. Otherwise the arrangement of FIGURE 9 is the same as described in connection with FIGURE 7. Here again the sphere member and the cooperating socket member of the connection between the valve operating mechanism and the valve stem compensate for angular misalignment and also make possible the delivery of hammer blows from the operating mechanism to the valve stem.

In the drawings and in the foregoing description, reference is made to arrangements in which the sphere member is employed to axially shift a valve stem without rotating the valve stem (FIGURE 1) and in which the sphere member is employed to rotate the valve stem without axially shifting the valve stem (FIGURES 7 and 9). It will be understood that if desired the sphere member may also be employed to rotate a valve stem in a situation where that valve stem is axially shiftable, for instance by employing an angular or squared opening in the sphere member through which a similarly shaped valve stem may shift in the axial direction but by means of which the stem may be turned.

We claim:

1. Valve operating equipment comprising cooperating sphere and socket members one of which is adapted to be associated with a valve stem for operation of the valve and the other of which is adapted to be rotatively driven by a valve operating device, the socket member having a plurality of internal arcuate grooves separated circumferentially of the socket by spaced abutments, the sphere member having circumferentially spaced recesses, and balls received partially in said recesses and partially in said grooves and serving as driving elements in cooperation with said abutments.

2. Equipment according to claim 1 in which the sphere member is provided with internal threading for cooperation with a complementarily threaded valve stem, to provide for axial movement of the valve stem by rotation of the sphere member.

3. Equipment according to claim 1 in which the sphere member is provided with a rotative connection for turning a valve stem and thus provide for rotation of the valve stem by rotation of the sphere member.

4. Valve operating equipment comprising in combination with a valve stem, cooperating sphere and socket members, the sphere member having means providing for connection with the valve stem for operation of the valve, the socket member having means providing for rotative drive thereof, the socket member being generally cylindrical and having a plurality of internal arcuate grooves separated circumferentially of the socket by spaced abutments, the sphere member having circumferentially spaced recesses, and balls received partially in said recesses and partially in said grooves and serving as driving elements in cooperation with said abutments for transmission of a driving force from the socket member to the sphere member.

5. Equipment according to claim 4 and further including a pair of abutment rings between the sphere and socket members providing for angular motion of the sphere member within the socket member, said rings lying in planes spaced axially of the socket member at opposite sides of the arcuate grooves therein.

6. Equipment according to claim 4 in which the sphere member is provided with a threaded connection for mating with a complementarily threaded valve stem to provide for axial movement of the valve stem by rotation of the sphere member, the equipment further including an abutment ring between the sphere and socket members serving as a thrust transmitting abutment in different relative angular positions of the sphere and socket members.

7. Equipment according to claim 4 in which the sphere member is provided with an extension projecting generally axially of the socket member and having a rotative connection for turning a valve stem and thus provide for rotation of the valve stem by rotation of the sphere member.

References Cited

UNITED STATES PATENTS 3,218,886   11/1965   Bacchi et al. _____ 74—626

FRED C. MATTERN, JR., *Primary Examiner.*

F. D. SHOEMAKER, *Assistant Examiner.*